(12) United States Patent
Suh

(10) Patent No.: US 9,238,277 B2
(45) Date of Patent: Jan. 19, 2016

(54) CUTTING/POLISHING TOOL AND MANUFACTURING METHOD THEREOF

(75) Inventor: Jeong-Hun Suh, Daejeon (KR)

(73) Assignees: INSSTEK, INC., Daejeon (KR); SHINHAN DIAMOND IND, CO., LTD, Incheon (KR)

(*) Notice: Subject to any disclaimer, the term of this patent is extended or adjusted under 35 U.S.C. 154(b) by 944 days.

(21) Appl. No.: 13/393,961

(22) PCT Filed: Sep. 6, 2010

(86) PCT No.: PCT/KR2010/006046
§ 371 (c)(1),
(2), (4) Date: Mar. 2, 2012

(87) PCT Pub. No.: WO2011/028074
PCT Pub. Date: Mar. 10, 2011

(65) Prior Publication Data
US 2012/0164927 A1 Jun. 28, 2012

(30) Foreign Application Priority Data
Sep. 4, 2009 (KR) .................. 10-2009-0083499

(51) Int. Cl.
*B23K 31/02* (2006.01)
*B22F 3/115* (2006.01)
(Continued)

(52) U.S. Cl.
CPC .............. *B23K 31/025* (2013.01); *B22F 3/115* (2013.01); *B22F 7/08* (2013.01); *B23K 9/04* (2013.01);
(Continued)

(58) Field of Classification Search
CPC ............ B23K 1/00; B23K 26/00; B05D 3/00; B05D 5/00
See application file for complete search history.

(56) References Cited

U.S. PATENT DOCUMENTS

| | | | | |
|---|---|---|---|---|
| 4,644,127 A | * | 2/1987 | La Rocca | B23K 26/18 219/121.64 |
| 5,314,003 A | * | 5/1994 | Mackay | 164/494 |

(Continued)

FOREIGN PATENT DOCUMENTS

| | | |
|---|---|---|
| CN | 1518605 A | 8/2004 |
| EP | 1402080 B | 5/2002 |

(Continued)

OTHER PUBLICATIONS

International Search Report for corresponding patent application No. PCT/KR2010/006046 dated Apr. 14, 2011.

*Primary Examiner* — Pegah Parvini
*Assistant Examiner* — Alexandra M Moore
(74) *Attorney, Agent, or Firm* — Renner, Otto, Boisselle & Sklar, LLP

(57) ABSTRACT

There are provided a cutting/polishing tool that may be readily manufactured and have an improved cutting performance, and a manufacturing method thereof.

The method for manufacturing the cutting/polishing tool including at least one cutting/polishing body may comprise preparing a tool body, and forming a cladding layer including cutting material particles by spraying, onto an outer surface of the tool body, the cutting material particles and a metal powder having a specific gravity greater than a specific gravity of the cutting material particles while heating the outer surface of the tool body using a heating device installed in a lower side of the outer surface of the tool body so that the metal powder is deposited on the outer surface of the tool body, wherein the cladding layer configures the at least one cutting/polishing body.

20 Claims, 9 Drawing Sheets

(51) Int. Cl.
*B22F 7/08* (2006.01)
*B23K 9/04* (2006.01)
*B23K 10/02* (2006.01)
*B23K 15/00* (2006.01)
*B23K 26/34* (2014.01)
*B23P 15/28* (2006.01)
*B24D 5/06* (2006.01)
*B24D 7/06* (2006.01)
*B24D 18/00* (2006.01)
*B23K 26/32* (2014.01)
*B23K 35/02* (2006.01)

(52) U.S. Cl.
CPC ........... *B23K 10/027* (2013.01); *B23K 15/0086* (2013.01); *B23K 26/3266* (2013.01); *B23K 26/3273* (2013.01); *B23K 26/34* (2013.01); *B23K 35/0244* (2013.01); *B23P 15/28* (2013.01); *B24D 5/06* (2013.01); *B24D 7/06* (2013.01); *B24D 18/00* (2013.01); *B23K 2201/20* (2013.01)

(56) References Cited

U.S. PATENT DOCUMENTS

| | | | |
|---|---|---|---|
| 6,035,844 A | 3/2000 | Otani et al. | |
| 6,122,564 A * | 9/2000 | Koch et al. | 700/123 |
| 6,143,095 A * | 11/2000 | Kim et al. | 148/224 |
| 6,146,476 A | 11/2000 | Boyer | |
| 6,316,065 B1 | 11/2001 | Wallmann | |
| 6,402,438 B1 | 6/2002 | Boyer | |
| 2003/0089364 A1 | 5/2003 | Kim et al. | |
| 2004/0188266 A1 | 9/2004 | Corcoran | |
| 2005/0235978 A1 | 10/2005 | Kim et al. | |
| 2008/0178994 A1 | 7/2008 | Qi | |

FOREIGN PATENT DOCUMENTS

| | | |
|---|---|---|
| JP | 59-076774 | 5/1984 |
| JP | 63-251170 | 10/1998 |
| JP | 2004-360040 A | 12/2004 |
| JP | 2006-527663 | 12/2006 |
| JP | 2008-190038 | 8/2008 |
| KR | 10-2000-0048900 | 7/2000 |
| WO | 03000943 | 3/2003 |

* cited by examiner

Fig. 1
(a)
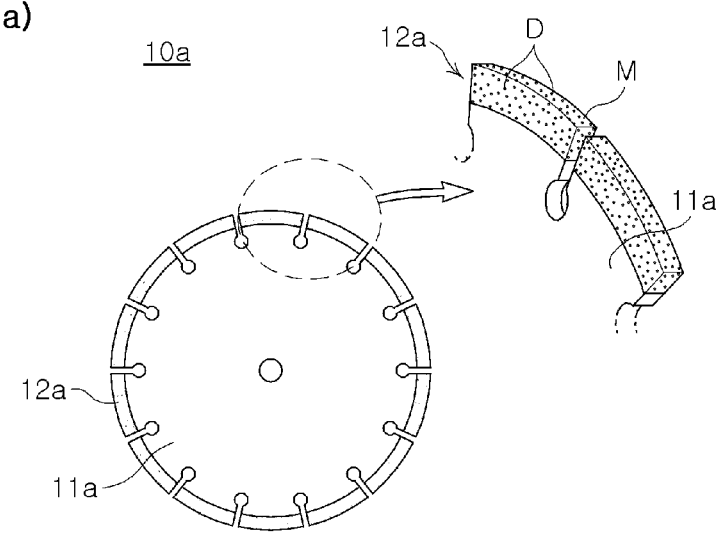
(b)
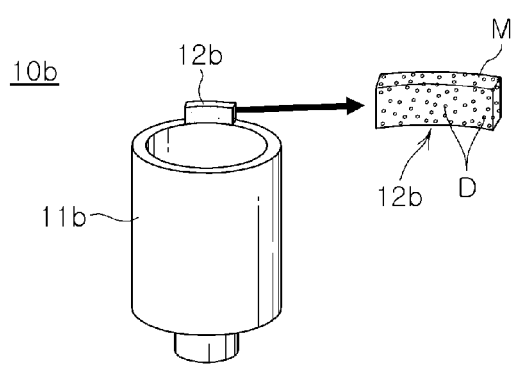
(c)
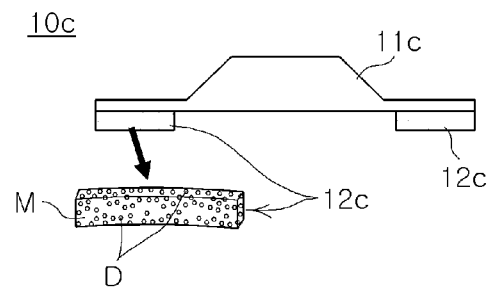

Fig. 2
Prior Art
(a)
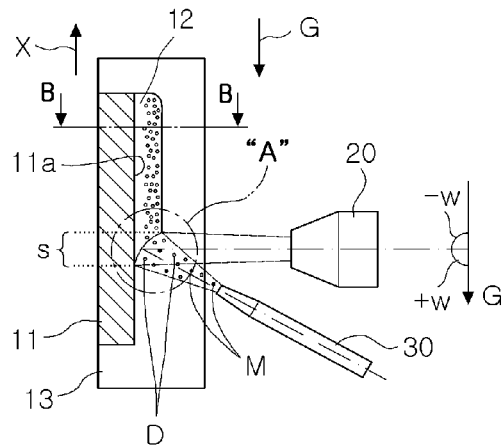
(b)
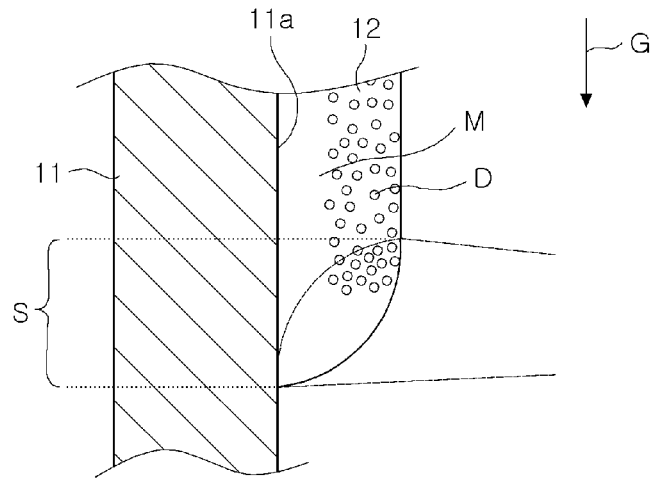
Fig. 3
Prior Art
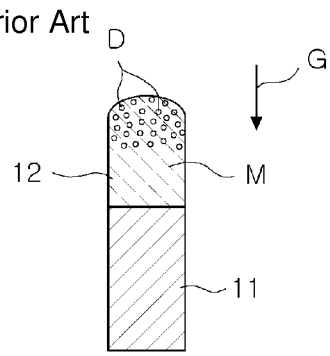

Fig. 10
(a)
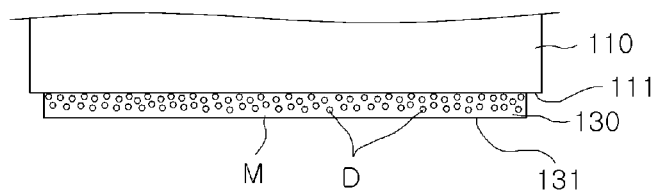
(b)
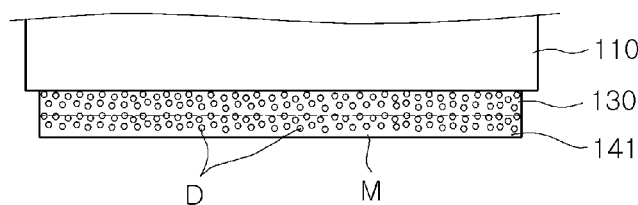
(c)
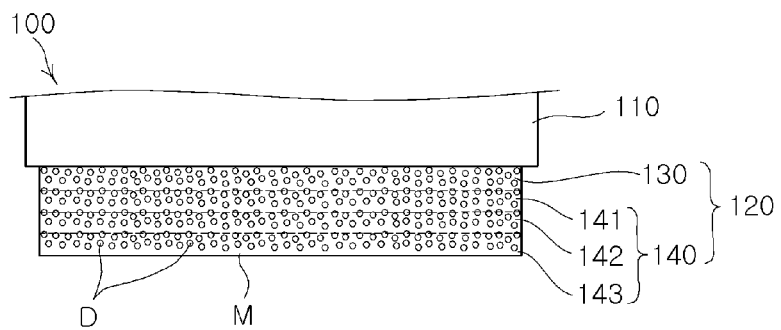

Fig. 12
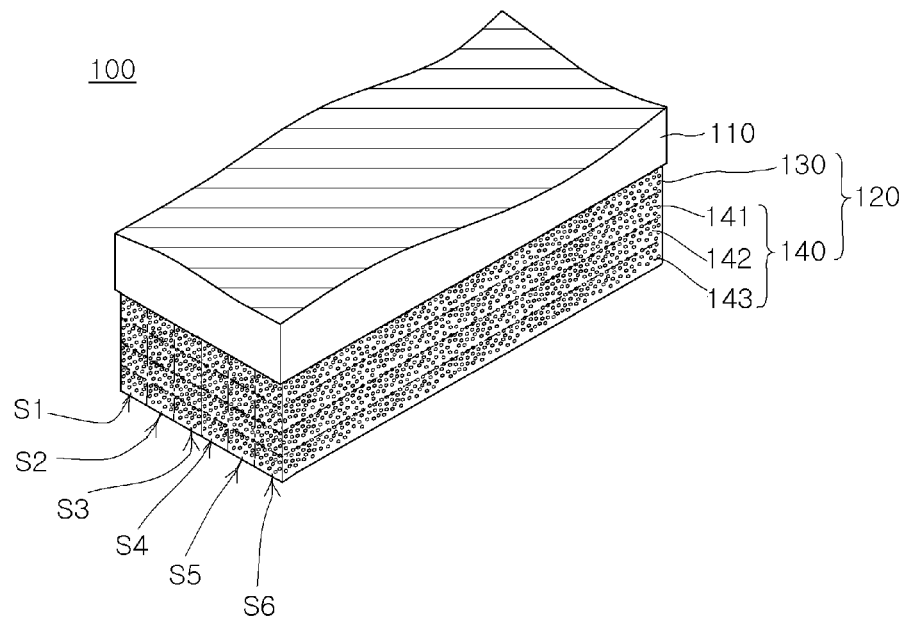
Fig. 13
(a)
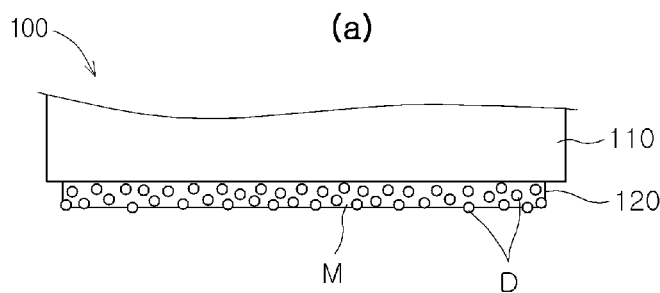
(b)
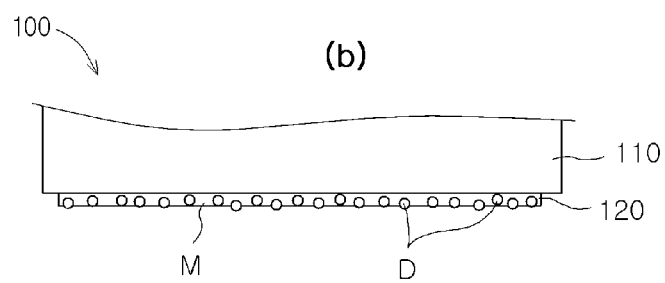

Fig. 14
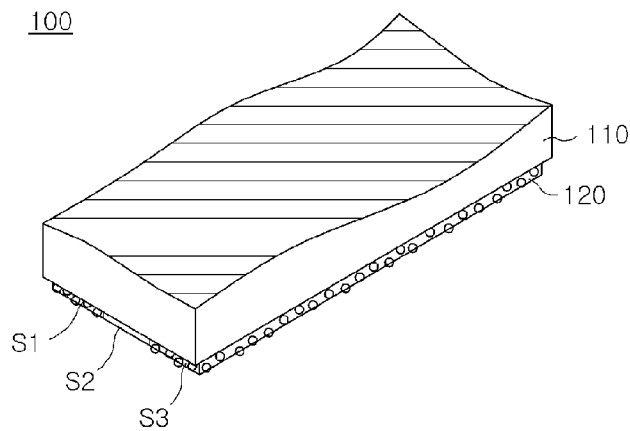
Fig. 15
(a)            (b)
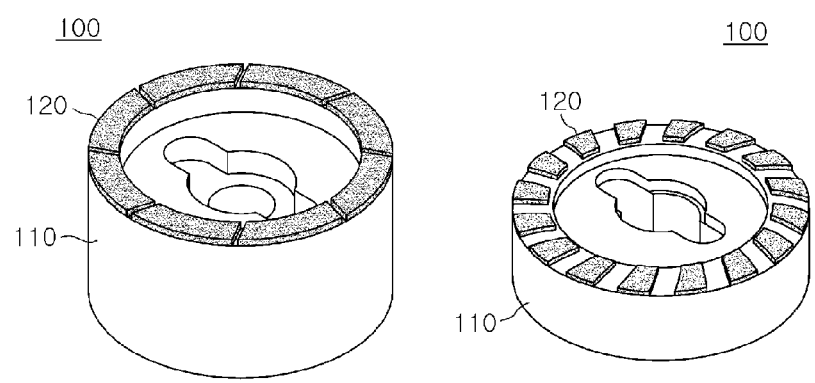
(c)            (d)
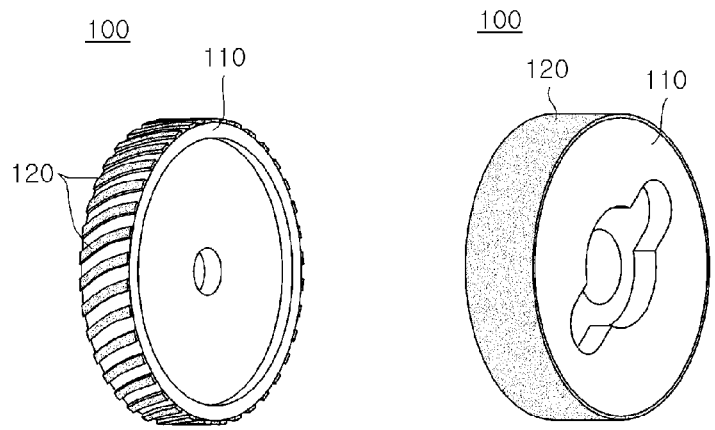

CUTTING/POLISHING TOOL AND MANUFACTURING METHOD THEREOF

This application is a national phase of International Application No. PCT/KR2010/006046 filed Sep. 6, 2010 and published in the English language.

TECHNICAL FIELD

The present invention relates to a cutting/polishing tool used for cutting, boring, or polishing a workpiece of a material such as a metal, a ceramic, a semiconductor, stone, brick, concrete, asphalt, and the like, and a manufacturing method thereof, and more particularly, to a cutting/polishing tool that is easily manufactured, and a manufacturing method thereof.

BACKGROUND ART

In general, to perform a cutting operation or a polishing operation, particles having excellent abrasion resistance such as diamond particles, carbide, boric acids, nitrides, hard metal and ceramic pieces may be used. Among these, diamonds are well-known as being the hardest substances on Earth, and have been widely used for a cutting tool or a grinding (polishing) tool due to this fact.

Typically, a diamond tool configured as segments may include a cutting/polishing segment (cutting tip) on which the diamond particles are distributed, and a metal body (tool body or shank) to which the cutting/polishing segment is fixed.

FIG. 1 is a view showing examples of various types of diamond tools configured as segments. As shown in FIG. 1(a), a saw blade 10a configured as segments includes a plurality of segments 12a (cutting tips) that are fixed to a disk shaped-metal body 11a. A core bit 10b configured as segments, as shown in FIG. 1(b), includes a plurality of segments 12b (cutting tips) that are fixed to a metal body 11b, and a polishing wheel 10c configured as segments, as shown in FIG. 1(c), includes a plurality of segments 12c (polishing tips) that are fixed to a bottom surface of a metal body 11c. As for the above described segments 12a, 12b, and 12c of the cutting/polishing tools 10a, 10b, and 10c, diamond particles (D) are randomly distributed between metal powders (bond metal)(M), and the diamond particles distributed in each segment may perform a cutting/polishing operation.

To manufacture the above described cutting/polishing segment, a powder metallurgy scheme may be generally used. Specifically, metal powder and diamond particles (crystals) are mixed, and the mixture is molded into a cutting/polishing segment shaped-form. Then, the obtained molding is heated to a high temperature to form the cutting/polishing segment with dense tissue through a sintering scheme or a hot pressing scheme. Thereafter, the cutting/polishing segment is bonded to the tool body (shank), and in this bonding process, a laser welding, a brazing using a silver solder, a diffusion bonding using sintering, and the like may be used. However, the above described tool manufacturing method may have many problems in that a complex process such as sintering and the like may be required for manufacturing the cutting/polishing segment, and an additional process such as a welding operation, or the like, may be required for fixing the cutting/polishing segment to the tool body, and therefore many processes and facilities may be required for manufacturing the cutting/polishing tool, and much labor may be also required.

In order to overcome these problems, there is disclosed Korean Patent No. 452563 (U.S. Pat. No. 6,316,065) directed to a manufacturing method for a cutting tool using a laser cladding technology.

As shown in FIG. 2(a), in a manufacturing method for a cutting tool disclosed in Korean Patent No. 452563, a mixed powder of the metal powder (M) and the diamond particles (D) may be sprayed using a powder supplying device 30 while heating an outer surface 11a of a tool body 11 using a laser heating device 20, and the mixed powder of the metal powder (M) and the diamond particles (D) may be deposited on the outer surface 11a of the tool body 11 to form a cutting body 12. In this instance, while the cutting body 12 is formed on the tool body 11 of the cutting tool, the tool body 11 may be moved to a direction (X) opposite to a gravity direction (G), and an angle (±w) between the gravity direction (G) and a line perpendicular to a section (S) where the deposition is performed by a laser heating device 20 may be maintained in a range of 60 degrees to 90 degrees for a time period during which the mixed powder is clotted. Also, as shown in FIG. 4, even in a case of forming a cutting body 12' on an outer surface 11a' while rotating a disk-shaped tool body 11', the angle (±w) between the gravity direction (G) and the line perpendicular to the section (S) where the deposition is performed may be maintained in the range of 60 degrees to 90 degrees for the time period during which the mixed powder is clotted.

As described above, the manufacturing method for the cutting tool shown in FIG. 2(a) and FIG. 4 may allow the cutting tool to be manufactured through a single process by laser-cladding the metal powder (M) and the diamond particles (D) directly onto the tool bodies 11 and 11', and thereby may improve productivity and reduce manufacturing costs. Also, in the case of sintering the cutting/polishing segment, a mechanical bond between the diamond particles and the metal powder is achieved, however, in a case of using the laser cladding technology, a chemical bond between the diamond particles and the metal powder is achieved and thus, the manufacturing method may improve an adhesion and a quality of the tool thereby.

In addition, as for the manufacturing method for the cutting tool disclosed in the above Korean Patent, since the tool body 11 may be moved in the direction (X) opposite to the gravity direction (G) while being heated in a practically horizontal direction using the laser heating device 20, there is an advantage in that a distribution range of the diamond particles (D) is relatively widened in comparison with the related art (background art of the Korean Patent No. 452563) where heat is applied from an upper side of the tool body 11.

Meanwhile, in the case of manufacturing the cutting tool using the laser cladding process, a melting and a clotting momentarily occur in an area where a laser beam is radiated, however, the diamond particles may be moved in the direction opposite to the gravity direction, due to a specific gravity difference between the diamond particles and a melted metal powder, even in the short period of time.

Specifically, referring to FIG. 2(b), an oval shaped-molten pool may be generated on a processing part of the cutting body 12 corresponding to a section (S) where the laser beam is radiated, by a transfer speed of the tool body 11 and a radiation direction of the laser beam, and the diamond particles (D) may be momentarily moved to a top end of the molten pool due to a specific gravity lower than a specific gravity of the molten metal powder (M). Specifically, the diamond particles (D) may be densely located in a part of the oval-shaped molten pool that is far from the outer surface 11a of the tool body 11.

Consequently, in the manufacturing method for the cutting tool disclosed in the Korean Patent, since the diamond particles (D) are densely located only in an outer surface side of the cutting body 12 as shown in FIG. 3, the diamond particles (D) are not uniformly distributed throughout the entire cutting body 12 and thus, the efficiency of the cutting tool may not be uniformly achieved, and the cutting body 12 may not be used as a whole.

Also, in the manufacturing method for the cutting tool disclosed in the Korean Patent, there is a problem in that since the diamond particles (D) are densely located on the outer surface side of the cutting body 12, that is, the outer surface, an additional laser cladding process may not be performed in a part of the previously formed cutting body 12. That is, in a case of melting the outer surface of the previously formed cutting body 12 by repeatedly applying heat to the outer surface of the previously formed cutting body 12, the cutting performance of the diamond particles may be degraded and oxidation of the diamond particles may be easily generated due to properties of the diamond particles that are susceptible to heat. In addition, since the metal powder (M) restraining the diamond particles (D) may be re-melted, restraints on the diamond particles (D) may be released, so that the deposited diamond particles may be floating so as to be densely located in the outer surface side of the molten pool. As a result, it is difficult to perform laser cladding processes multiple times.

DISCLOSURE

Technical Problem

An aspect of the present invention provides a cutting/polishing tool that may be readily manufactured, and have an improved cutting performance due to a uniform distribution of cutting material particles, and a manufacturing method thereof.

Another aspect of the present invention provides a cutting/polishing tool that may perform a laser cladding process a plurality of times to increase a thickness of a cutting/polishing body, and a manufacturing method thereof.

Another aspect of the present invention provides a cutting/polishing tool that may obtain a cutting/polishing body having a widened area through a cladding process performed a plurality of times, and a manufacturing method thereof.

Yet another aspect of the present invention provides a cutting/polishing tool that may adjust an amount of cutting material particles included in a cladding layer, or control a thickness (height) of the cladding layer, and a manufacturing method thereof.

Another aspect of the present invention provides a cutting/polishing tool that may control a temperature of a molten pool to prevent a performance of cutting material particles from being degraded, and a manufacturing method thereof.

Further aspect of the present invention provides a method for manufacturing a cutting/polishing tool that may repair a damaged cutting/polishing tool.

Further aspect of the present invention provides a cutting/polishing tool that may divide a single cladding layer a plurality of times to have a complex-shaped cutting/polishing body, and a manufacturing method thereof.

Technical Solution

According to an aspect of the present invention, there is provided a method for manufacturing a cutting/polishing tool including at least one cutting/polishing body, the method including: preparing a tool body; and forming a cladding layer including cutting material particles by spraying, to an outer surface of the tool body, the cutting material particles and a metal powder having a specific gravity greater than a specific gravity of the cutting material particles while heating the outer surface of the tool body using a heating device installed in a lower side of the outer surface of the tool body so that the metal powder is deposited on the outer surface of the tool body and the cutting material particles are distributed in the cladding layer, wherein the cladding layer configures the at least one cutting/polishing body.

The method may further include accumulating at least one new cladding layer including the cutting material particles by spraying, to an outer surface of the previously formed cladding layer, the cutting material particles and the metal powder while heating the outer surface of the previously formed cladding layer using the heating device so that the metal powder is deposited on the outer surface of the previously formed cladding layer, wherein the accumulated cladding layer configures the cutting/polishing body.

According to another aspect of the present invention, there is provided a method for manufacturing a cutting/polishing tool including at least one cutting/polishing body, the method including: preparing a tool body; forming a cladding layer including cutting material particles by spraying, to an outer surface of the tool body, the cutting material particles and a metal powder while heating the outer surface of the tool body using a heating device so that the metal powder is deposited on the outer surface of the tool body and the cutting material particles are distributed in the cladding layer and accumulating at least one new cladding layer including the cutting material particles by spraying, to an outer surface of the previously formed cladding layer, the cutting material particles and the metal powder while heating the outer surface of the previously formed cladding layer using the heating device so that the metal powder is deposited on the outer surface of the previously formed cladding layer and the cutting material particles are distributed in the new cladding layer, wherein the accumulated cladding layer configures the cutting/polishing body.

The outer surface of the tool body may be divided into a pluraltiy of cladding layer-forming sections corresponding to a part where the deposition of the metal powder is processed by the heating device in accordance with a relative transfer of the tool body and the heating device, and an angle between a vertical line perpendicular to the cladding layer-forming section and a gravity direction may be in a range of −10 degrees to 40 degrees.

The cladding layer-forming section of the tool body may be moved to a direction perpendicular to a gravity direction, and an angle between a vertical line perpendicular to the cladding layer-forming section and the gravity direction may be maintained in a range of −10 degrees to 40 degrees during a process where the curring material particles are floating within the cladding layer-forming section to be fixedly located.

The heating device may heat the cladding layer-forming section while forming an angle smaller than 40 degrees with respect to a gravity direction.

Meanwhile, to form the cladding layer having a wide area (range), the cladding layer may be formed such that a plurality of segment layers including the cutting material particles are combined while the metal powder is deposited. In this case, the cladding layer may be formed such that the plurality of segment layers, classified depending on whether to include the cutting material particles and a content of the cutting material particles, is combined. As an example, the cladding layer may include a first segment layer including the cutting material particles while the metal powder is deposited, and a second segment layer not including the cutting material particles while the metal powder is deposited.

Also, the forming of the cladding layer may be performed while adjusting a spraying amount of at least one of the cutting material particles and the metal powder so that a height of the cladding layer is adjusted.

In addition, during the forming of the cladding layer, a single cladding layer may be formed by forming the plurality of segment layers, and the accumulating may form the plurality of segment layers, where the metal powder is deposited on the outer surface of the cladding layer formed such that the plurality of segment layers are combined, to thereby form the accumulated cladding layer and thus, a cutting/polishing body having a wide area and a great thickness may be formed.

Meanwhile, the forming of the cladding layer may determine an amount of each of the cutting material particles and the metal powder so that the cutting material particles are not exposed to the outside after the deposition of the metal powder is completed. On the other hand, the accumulating may determine an amount of each of the cutting material particles and the metal powder so that the cutting material particles are not exposed to the outside after the deposition of the metal powder is completed.

In addition, the method may further include, after the accumulating, dressing the cutting/polishing body and exposing the cutting material particles to the outside.

The forming of the cladding layer may determine an amount of each of the cutting material particles and the metal powder so that a part of the cutting material particles is exposed after the deposition of the metal powder is completed, and the cladding layer formed as a single layer through the forming of the cladding layer may configure the cutting/polishing body.

Also, the forming of the cladding layer and/or the accumulating may be performed by performing a translational movement, a rotary movement, or a translational/rotary movement with respect to the tool body.

Meanwhile, the heating device may be a laser device. In this instance, when including diamond particles as the cutting material particles, the heating device may be a laser device emitting a laser having a wavelength that penetrates through the diamond particles. The laser device may be any one of a $CO_2$ laser device, an Nd-YAG laser device, a fiber laser device, a diode laser device, and a disk laser device. Also, since the diamond particles are susceptible to heat, an output of the heating device may be adjusted such that a temperature of a molten pool in which the metal powder is melted does not exceed a preset temperature.

In addition, a spraying amount of each of the cutting material particles and the metal powder may be separately controlled.

Meanwhile, the method for manufacturing the cutting/polishing tool according to an aspect of the present invention may be applied to repair a tool including a damaged cutting/polishing body, and in this case, the forming of the cladding layer may be performed with respect to the damaged cutting/polishing body.

According to still another aspect of the present invention, there is provided acutting/polishing tool, including: a tool body; and at least one cutting/polishing body including a cladding layer having cutting material particles while the cladding layer is formed such that a metal powder is deposited on an outer surface of the tool body, wherein the cutting material particles of the cladding layer are more densely located in a part closer to the tool body rather than a part further away from the tool body. Here, the cladding layer may be directly formed on the outer surface of the tool body.

In this instance, the cutting/polishing body may be formed such that a plurality of cladding layers are accumulated, and the cutting/polishing body may include the cutting material particles having a uniform distribution throughout a thickness of the cutting/polishing body.

Also, the cladding layer may be formed such that a plurality of segment layers are combined. Here, the plurality of segment layers may be formed such that the metal powder is deposited.

In addition, the cladding layer may be formed such that a plurality of segment layers are combined. Here, the plurality of segment layers may be classified depending on whether to include the cutting material particles and a content of the cutting material particles. In this case, as an example, the cladding layer may comprise a first segment layer including the cutting material particles while the metal powder is deposited, and a second segment layer not including the cutting material particles while the metal powder is deposited.

Also, in a case where a single cladding layer configures the cutting/polishing body, the cladding layer may have a configuration where a portion of the cutting material particles is exposed to the outside without being covered with the metal powder.

Advantageous Effects

As set forth above, according to exemplary embodiments of the present invention, it is possible to directly form a cutting/polishing body on a tool body using a laser cladding process, thereby readily manufacturing the cutting/polishing tool.

Further, according to an exemplary embodiment of the present invention, since an outer surface of a tool body may be heated using a heating device installed on a lower side of the tool body and cutting material particles are floating upwardly (towards the tool body) within a molten pool, it is possible to form an additional cladding layer on the previously formed cladding layer, and thereby a thickness (height) of the cutting/polishing body may be increased.

In addition, according to an exemplary embodiment of the present invention, it is possible to manufacture the cutting/polishing tool to have an improved cutting performance due to a uniform distribution of the cutting material particles by adjusting an angle range of a gravity direction and a molten pool section and also adjusting a supply amount of the metal powder and the cutting material particles.

Further, according to an exemplary embodiment of the present invention, it is possible to manufacture the cutting/polishing tool that may have the cutting/polishing body having a widened area by forming a plurality of segment layers and forming a single cladding layer using the plurality of segment layers.

Further, according to an exemplary embodiment of the present invention, it is possible to manufacture various types of the cutting/polishing tool by controlling a spraying amount of each of the cutting material particles and the metal powder, and thereby may adjust a height (thickness) of the cladding layer.

Further, according to an exemplary embodiment of the present invention, it is possible to control a temperature of a molten pool to prevent a performance of the cutting material particles from being degraded.

Further, according to an exemplary embodiment of the present invention, it is possible to use the method for manufacturing a cutting/polishing tool of the present invention for repairing a damaged cutting/polishing tool.

Further, according to an exemplary embodiment of the present invention, it is possible to manufacture a cutting/polishing tool that may have a complex-shaped cutting/polishing body by forming a plurality of segment layers, and forming a single cladding layer using the plurality of segment layers.

DESCRIPTION OF DRAWINGS

FIG. 1 is a view showing examples of various types of a diamond tool configured as segments according to a related art:
  (a) is an example of a saw blade configured as segments,
  (b) is an example of a core bit configured as segments, and
  (c) is an example of a polishing wheel configured as sections.

FIG. 2 is a schematic view showing a prior art method for manufacturing a cutting tool having a plane cutting body according to a related art:
  (a) is a partial cross-sectional view showing a process of manufacturing a cutting body by a cladding operation, and
  (b) is an enlarged view of "A".

FIG. 3 is a cross-sectional view taken along a B-ϵ line of FIG. 2(a).

FIGS. 10(a) to 10(c) are schematic views sequentially showing a method for manufacturing a cutting/polishing tool including a plurality of accumulated cladding layers according to an exemplary embodiment of the present invention.

FIG. 12 is a partially cut-away perspective view showing a cutting/polishing tool in which a plurality of cladding layers having a wide area are accumulated according to an exemplary embodiment of the present invention.

FIGS. 13(a) and 13(b) are cross-sectional views showing a cutting/polishing tool including a cutting/polishing body configured as a single cladding layer according to an exemplary embodiment of the present invention.

FIG. 14 is a partially cut-away perspective view showing a cutting/polishing tool configured as a single cladding layer and having a wide area according to an exemplary embodiment of the present invention.

FIGS. 15(a) to 15(d) are examples of a cutting/polishing tool that is manufactured into various shapes according to an exemplary embodiment of the present invention.

BEST MODE

Hereinafter, exemplary embodiments will be described in detail with reference to the accompanying drawings so that they can be easily practiced by those skilled in the art to which the present invention pertains. Here, the accompanying drawings may be shown in a somewhat exaggerated manner for the description thereof, and may be merely provided as a reference without limiting the scope of the present invention.

Figure 4:
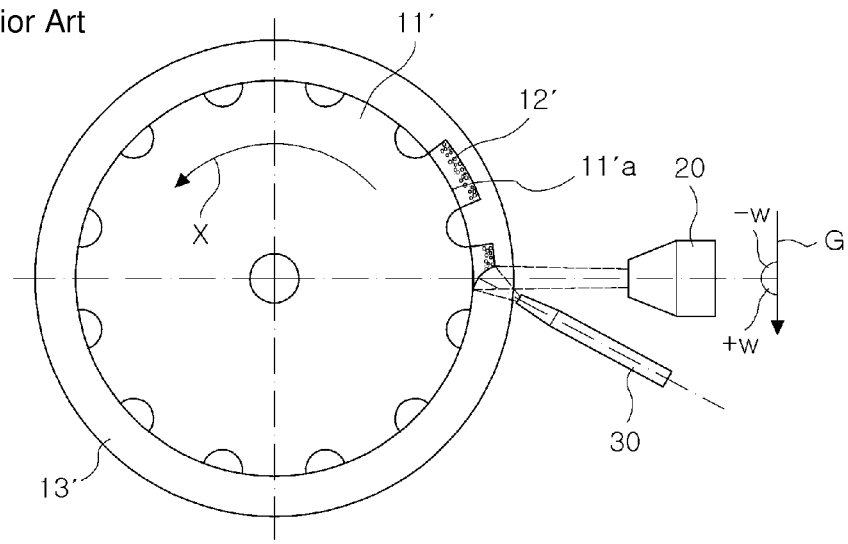
FIG. 4 is a schematic view showing a prior art method for manufacturing a cutting tool having a circular cutting body according to the related art.
Figure 5:
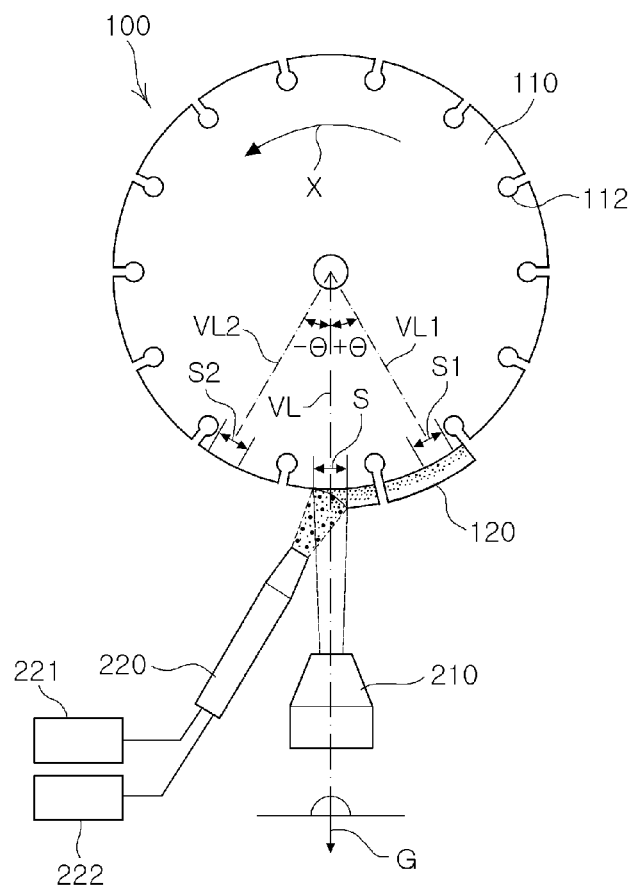
FIG. 5 is a schematic view showing a method for manufacturing a cutting/polishing tool according to an exemplary embodiment of the present invention.
Figure 6:
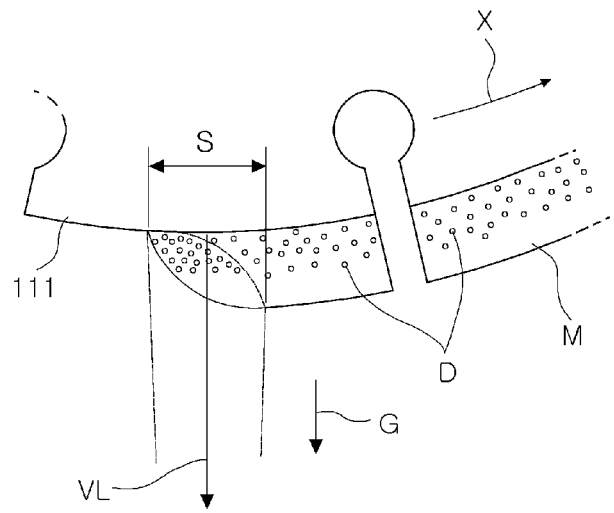
FIG. 6 is an enlarged view of a cladding layer-forming section of FIG. 5.
Figure 7:
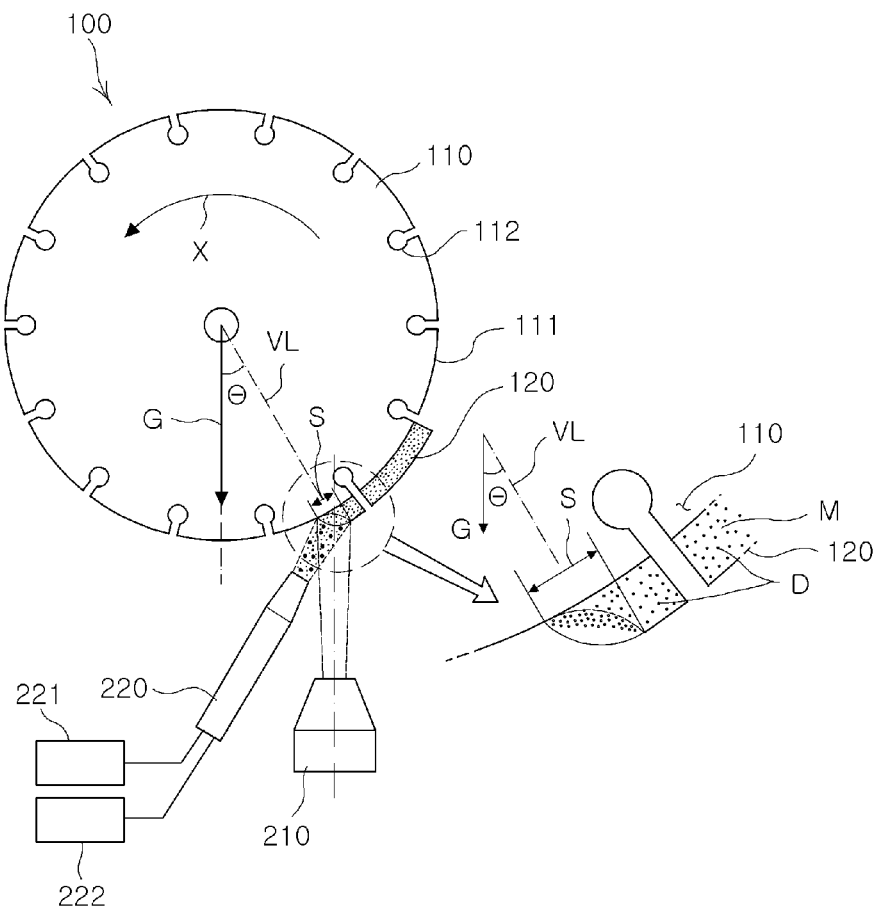
FIG. 7 is a schematic view showing a method for manufacturing a cutting/polishing tool according to another exemplary embodiment of the present invention.
Figure 8:
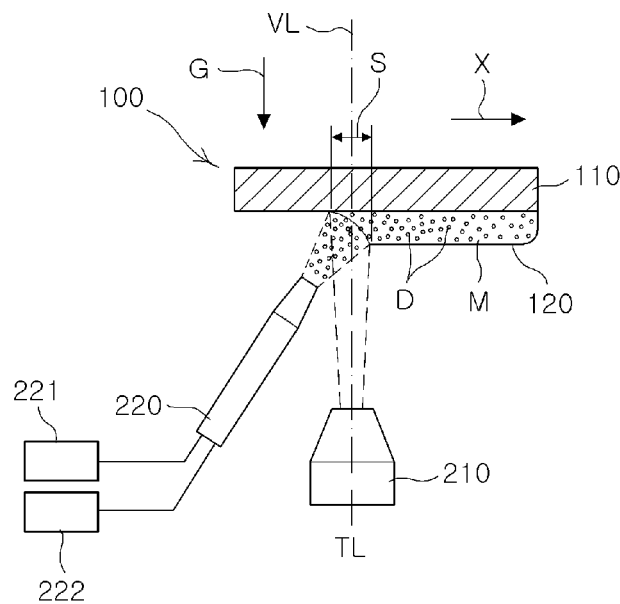
FIG. 8 is a schematic view showing a method for manufacturing a cutting/polishing tool having a plane cutting/polishing body according to an exemplary embodiment of the present invention.
Figure 9:
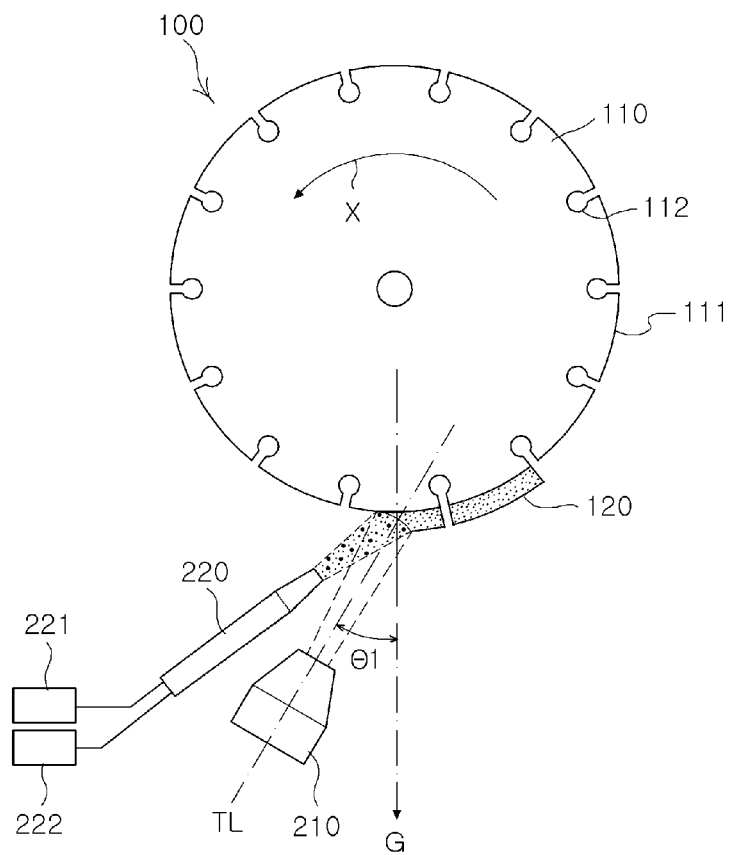
FIG. 9 is a schematic view showing a method for manufacturing a cutting/polishing tool according to another exemplary embodiment of the present invention.
Figure 11:
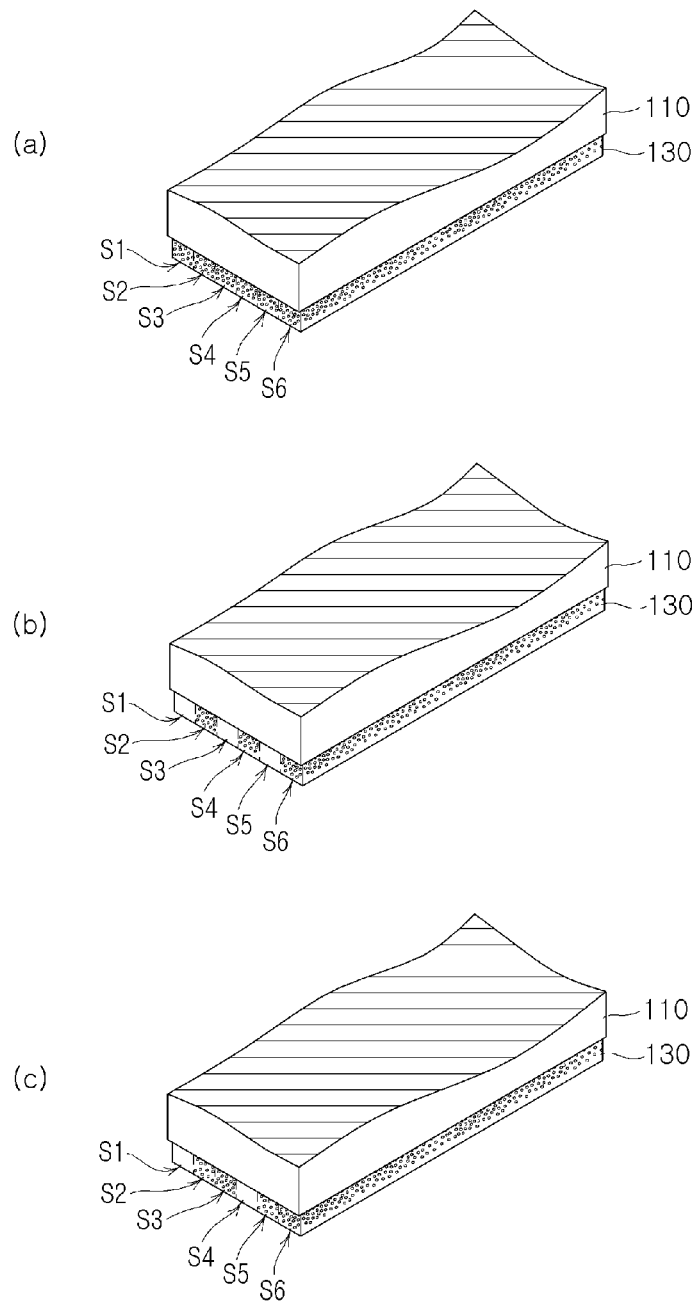
FIGS. 11(a) to 11(c) are partially cut-away perspective views showing various examples of a cutting/polishing tool having a wide area according to an exemplary embodiment of the present invention.

FIG. 5 is a schematic view showing a method for manufacturing a cutting/polishing tool according to an exemplary embodiment of the present invention. FIG. 6 is an enlarged view of a cladding layer-forming section of FIG. 5. FIG. 7 is a schematic view showing a method for manufacturing a cutting/polishing tool according to another exemplary embodiment of the present invention. FIG. 8 is a schematic view showing a method for manufacturing a cutting/polishing tool having a plane cutting/polishing body according to an exemplary embodiment of the present invention. FIG. 9 is a schematic view showing a method for manufacturing a cutting/polishing tool according to another exemplary embodiment of the present invention. FIGS. 10(a) to 10(c) are schematic views sequentially showing a method for manufacturing a cutting/polishing tool including a plurality of accumulated cladding layers according to an exemplary embodiment of the present invention. FIGS. 11(a) to 11(c) are partially cut-away perspective views showing various examples of a cutting/polishing tool having a wide area according to an exemplary embodiment of the present invention. FIG. 12 is a partially cut-away perspective view showing a cutting/polishing tool where a plurality of cladding layers having a wide area is accumulated according to an exemplary embodiment of the present invention. FIGS. 13(a) and 13(b) are cross-sectional views showing a cutting/polishing tool including a cutting/polishing body configured as a single cladding layer according to an exemplary embodiment of the present invention. FIG. 14 is a partially cut-away perspective view showing a cutting/polishing tool configured as a single cladding layer and having a wide area according to an exemplary embodiment of the present invention. FIGS. 15(a) to 15(d) are examples of a cutting/polishing tool that is manufactured into various shapes according to an exemplary embodiment of the present invention.

First, referring to FIGS. 5 and 6, a method for manufacturing a cutting/polishing tool according to an exemplary embodiment of the present invention will hereinafter be described.

The method for manufacturing the cutting/polishing tool according to the present exemplary embodiment of the present invention may relate to a method for manufacturing a cutting/polishing tool 100 including at least one cutting/polishing body 120, and include preparing a tool body and forming a cladding layer.

The preparing of the tool body may prepare a tool body 110 where a cutting/polishing body 120 is formed, similar to a typical cutting/polishing tool. As an example, as shown in FIG. 5, the tool body 110 may be formed of a disk shaped metal body on which grooves 112 partitioning parts where the cutting/polishing body 120 is formed are formed.

In addition, the forming of the cladding layer may include spraying, to an outer surface 111 of the tool body 110, cutting material particles (D) and a metal powder (M) having a specific gravity greater than a specific gravity of the cutting material particles (D) while heating the outer surface 111 of the tool body 110 using a heating device 210 installed in a lower side of the outer surface 111 of the tool body 110. Through the spraying, the metal powder (M) may be deposited on the outer surface 111 of the tool body 110 to form the cladding layer, and the cutting material particles (D) may be included within the cladding layer. In this manner, the cladding layer where the cutting material particles (D) and metal powder (M) are deposited may configure the cutting/polishing body 120.

As described above, in a case of heating the outer surface 111 of the tool body 110 in a lower side direction of the outer surface 111 of the tool body 110, the cutting material particles (D) having a relatively smaller specific gravity are floating upward above a molten pool in a direction opposite to a gravity direction (G) as shown in FIG. 6, and are distributed in a part closer to the tool body 110. Accordingly, since the cutting material particles (D) are not exposed to the outside from a surface of the cutting/polishing body 120, it is possible to form an additional cladding layer, which will be described later. Meanwhile, the cutting material particles (D) supplied from a cutting material particle-supplying part 221 and the metal powder (M) supplied from a metal powder-supplying part 222 may be mixed in a material spraying part 220, and then may be sprayed through a nozzle. In this instance, a spraying amount of each of the cutting material particles (D) and the metal powder (M) supplied to the material spraying part 220 may be separately controlled in the cutting material particle-supplying part 221 and the metal powder-supplying part 222, respectively.

As the metal powder sprayed from the metal powder-supplying part 222, a typical metal powder may be used, as examples of the metal powder, one metal or at least two metals selected from ferrous and non-ferrous metal groups including Fe, Cu, Co, Ni, Cr, Ti, W, WC, Sn, CuSn, Ag, and P may be given. As another example of the metal powder, a pre-alloyed powder including one metal or at least two metals selected from the above described metal groups may be given. Also, the cutting material particles supplied from the cutting material-supplying part 221 may be selected from a group consisting of diamond particles, carbide, boric acids, nitrides, and hard metal and ceramic pieces, and as an example, diamond particles having a most excellent hardness may be used.

Also, as the heating device 210, various types of the heating device may be used, however, a laser device having high energy intensity may be preferably used to enhance efficiency of the cladding. Meanwhile, in a case where the cutting material particles (D) include diamond particles, a laser device that emits a laser having a wavelength capable of penetrating the diamond particles may be used as the heating device 210, so that the diamond particles are not melted. As the laser device, any one of a $CO_2$ laser device, an Nd-YAG laser device, a fiber laser device, a diode laser device, and a disk laser device may be used.

In addition, since the diamond particles are susceptible to heat, an output of the heating device 210 may be desirably adjusted so that a temperature of the molten pool in which the metal powder (M) is melted does not exceed a preset temperature. For this, a contactless temperature sensor (not shown) measuring the temperature of the molten pool may be provided, and a control part (not shown) may reduce the output of the heating device 210 when the temperature of the molten pool sensed in the temperature sensor exceeds the preset temperature, and otherwise, may increase the output of the heating device 210 so that the cladding may be effectively generated.

Referring to FIGS. 5 and 6, the outer surface 111 of the tool body 110 may be divided into a plurality of cladding layer-forming sections (S) corresponding to a part where the deposition of the metal powder (M) is processed by the heating device 210 in accordance with a relative transfer of the tool body 110 and the heating device 210. Specifically, the cladding layer-forming section (S) may be a portion of the outer surface 111 of the tool body 110 corresponding to a portion in which the molten pool is generated by the heating of the heating device 210.

In this instance, so that the cutting material particles (D) are uniformly distributed on the cutting/polishing body 120, an angle (θ, theta) between a vertical line (VL) perpendicular to the cladding layer-forming section (S) and the gravity direction (G) may desirably have a range of −10 degrees to 40 degrees in a state where the heating is performed from a lower side of the tool body 110 by the heating device 210.

Referring to FIG. 5, the angle (θ) between the vertical line (VL) perpendicular to the cladding layer-forming section (S) and the gravity direction (G) is a zero-degree, and a positive value and a negative value of the angle are determined based on an advancing direction (X) of the tool. For example, as for the angle (θ), the advancing direction (X) of the tool may have the positive value, and a direction opposite to the advancing direction of the tool may have the negative value, with respect to the cladding layer-forming section (S). Specifically, in FIG. 5, an angle (θ) between a vertical line (VL1) perpendicular to a cladding layer-forming section (S1) and the gravity direction (G) has a positive value, and an angle (−θ) between a vertical line (VL2) perpendicular to a cladding layer-forming section (S2) and the gravity direction (G) has a negative value. In this manner, when the angle (θ) between the vertical line (VL) perpendicular to the cladding layer-forming section (S) and the gravity direction (G) is in a range of −10 degrees to 40 degrees, the cutting material particles (D) may be floating upward above the molten pool, and may be rarely located in an outer surface side of the cutting/polishing body 120 as shown in FIG. 6, and thereby it is possible to form an additional cladding layer on the previously formed cladding layer without causing oxidation or performance degradation of the cutting material particles (D). In this instance, when the angle (θ) is less than the −10 degrees or greater than the 40 degrees, the cutting material particles (D) may be moved to the outer surface side of the cutting/polishing body 120, and thereby it is difficult to form the additional cladding layer, or the performance of the cutting material particles (D) may be degraded.

In FIG. 7, a case in which the angle (θ) between the vertical line (VL) perpendicular to the cladding layer-forming section (S) and the gravity direction (G) is about 30 degrees in a state where the heating is performed from the lower side of the tool body 110 by the heating device 210 is shown. In this manner, when the angle (θ) between the vertical line (VL) perpendicular to the cladding layer-forming section (S) and the gravity direction (G) is about 30 degrees, for example, when the angle is in a range of 25 degrees to 35 degrees, since the molten pool generated by the relative transfer of the tool body 110 and the heating device 210 is widely generated in a horizontal direction perpendicular to the gravity direction, the cutting material particles (D) may be distributed throughout the entire thickness of the cutting/polishing body 120 although the cutting material particles (D) are floating within the molten pool.

However, an angle (θ) at which the cutting material particles (D) are distributed throughout the entire thickness of the cutting/polishing body 120 may be changed depending on a transfer speed of the tool body 110 or a cooling rate of the molten pool, however, may be determined in an angle range closer to the 30 degrees.

Here, when the angle (θ) between the vertical line (VL) perpendicular to the cladding layer-forming section (S) and the gravity direction (G) is in a range of −10 degrees to 40 degrees, the cutting material particles (D) may be rarely located in the outer surface side of the cutting/polishing body 120, and therefore it is possible to form an additional cladding layer on the previously formed cladding layer without causing oxidation or performance degradation of the cutting material particles (D). When the angle (θ) is about 30 degrees (for example, a range of 25 degrees to 35 degrees), the cutting material particles (D) may be uniformly distributed throughout the entire thickness of the cutting/polishing body 120, and thereby the performance of the cutting/polishing body 120 may be improved.

In FIG. 8, unlike FIG. 5 and FIG. 7, so that the cutting/polishing body 120 is formed on a plane of the tool body 110, a case in which a translational movement is performed with respect to the tool body 110 may be shown. In this case of FIG. 8, since the heating is performed from the lower side of the tool body 110 by the heating device 210, and the angle (θ) between the vertical line (VL) perpendicular to the cladding layer-forming section (S) and the gravity direction (G) is in the range of −10 degrees to 40 degrees, the cutting material particles (D) may be rarely located in the outer surface side of the cutting/polishing body 120, and thereby it is possible to form the additional cladding layer on the previously formed cladding layer without causing an oxidation or performance degradation of the cutting material particles (D).

Meanwhile, as shown in FIG. 5 and FIG. 8, the cladding layer-forming section (S) in which the molten pool is generated may be moved in the direction (X) perpendicular to the gravity direction (G), and the angle (θ) between the vertical line (VL) perpendicular to the cladding layer-forming section (S) and the gravity direction (G) may be maintained in the range of −10 degrees to 40 degrees while the cutting material particles (D) are fixedly located in a state of being floating within the cladding layer-forming section (S) to be cooled (solidified). Specifically, since a period of time during which the molten pool is generated by the heating of the heating device 210 is significantly short, when the cladding layer-forming section (S) is moved in the direction (X) perpendicular to the gravity direction (G) due to the movement of the tool body 110, the cutting material particles (D) may be fixedly located within the cooled metal powder (M), and rarely located on the outer surface side of the cutting/polishing body 120, and thereby it is possible to form an additional cladding layer on the previously formed cladding layer without causing an oxidation or performance degradation of the cutting material particles (D).

In addition, as shown in FIG. 9, the forming of the cladding layer may be configured such that the cladding layer-forming section (S) is heated while an angle (θ1) smaller than 40 degrees with respect to the gravity direction (G) is realized in a heating direction (TL) of the heating device 210, and even in this case, effects similar to those in FIG. 5, FIG. 7, and FIG. 8 may be obtained.

Meanwhile, referring to FIG. 10, the method for manufacturing the cutting/polishing tool according to an exemplary embodiment of the present invention may further include accumulating new cladding layers 141, 142, and 143 including the cutting material particles (D) by spraying, to a surface 131 of the previously formed cladding layer 130, the cutting material particles (D) and the metal powder (M) while heating the surface 131 of the previously formed cladding layer 130 using the heating device 210 so that the metal powder (M) is deposited on the surface 131 of the previously formed cladding layer 130. In this case, the accumulated cladding layers may configure the cutting/polishing body. In this instance, as for each of the forming of the cladding layer, in order to prevent oxidation, performance degradation and floating (separation from the previously formed cladding layer) of the cutting material particles (D) from occurring at the time of the forming of the accumulated cladding layers, an amount of each of the cutting material particles and the metal powder may be desirably determined such that the cutting material particles (D) are not exposed to the outside after the deposition of the metal powder (M) is completed.

Specifically, after the cladding layer 130 including the cutting material particles (D) is formed while the metal powder (M) is deposited on the outer surface 111 of the tool body 110 (see FIG. 10(a)), the additional cladding layer 141 formed such that the metal powder (M) is deposited on the surface 131 of the previously formed cladding layer 130 may be formed (see FIG. 10(b)). This process of forming the additional cladding layer may be repeatedly performed to form several cladding layers 142 and 143 as shown in FIG. 10(C). In this manner, the cladding layer 130 formed on the outer surface 111 of the tool body 110 and the accumulated cladding layer 140 formed on the outer surface of the previously formed cladding layer may be combined to configure the cutting/polishing body 120, and thereby a thickness (height) of the cutting/polishing body may be increased.

When repeatedly forming the cladding layer 130, the metal powder (M) adjacent to the surface 131 may be melted due to a newly performed deposition to generate a molten pool on the surface 131 of the previously formed cladding layer 130, and thereby newly supplied cutting material particles (D) may float towards a side of the tool body 110 within the molten pool in the new cladding layer 141. Accordingly, by adjusting a supplied amount of the metal powder (M) and a quantity of heat applied to the molten pool, it is possible to enable the cutting material particles (D) to have a uniform distribution throughout the entire thickness of the cutting/polishing body 120.

In addition, in order to expose the cutting material particles (D) in the cladding layer 143 located on the surface of the cutting/polishing body 120, dressing of the cutting/polishing body 120 may be further included.

Next, referring to FIG. 11(a), in order to form the cladding layer 130 having a wide area (range), the cladding layer 130 may be formed such that a plurality of segment layers S1, S2, S3, S4, S5, and S6 including the cutting material particles (D) is combined while the metal power (M) is deposited. In this case, the cladding layer 130 may be formed such that the plurality of segment layers S1, S2, S3, S4, S5, and S6, which are classified depending on whether to include the cutting material particles (D) and a content (amount) of the cutting material particles (D), are combined. As an example, as shown in FIG. 11(b), the cladding layer 130 may include first segment layers S2, S4, and S6 including the cutting material particles (D) while the metal powder (M) is deposited, and second segment layers S1, S3, and S5 not including the cutting material particles (D) while the metal powder (M) is deposited. Also, as shown in FIG. 11(c), the cladding layer 130 may include first segment layers S2, S3, S5, and S6 including the cutting material particles (D) while the metal powder (M) is deposited, and second segment layers S1, and S4 not including the cutting material particles (D) while the metal powder (M) is deposited, and the first segment layers S2, S3, S5, and S6 may be further classified depending on the content of the cutting material particles (D). In this manner, a single cladding layer 130 may be embodied in various types depending on whether to include the cutting material particles (D) and the content of the cutting material particles (D), and thereby it is possible to manufacture the cutting/polishing tool having various structures and functions.

In addition, as shown in FIG. 12, the single cladding layer 130 including the plurality of segment layers S1, S2, S3, S4, S5, and S6 may be formed, and the accumulated cladding layer 141 including the plurality of segment layers S1, S2, S3, S4, S5, and S6 may be repeatedly formed on the previously formed cladding layer 130, and thereby it is possible to manufacture the cutting/polishing body having a wide area and a great thickness.

Next, referring to FIG. 13, the forming of the cladding layer may be performed such that a spraying amount of each of the cutting material particles (D) and the metal powder (M) is determined to enable a portion of the cutting material particles (D) to be exposed when the deposition of the metal powder (M) is completed, and thereby the cladding layer formed as a single layer may configure the cutting/polishing body 120. In this case, as shown in FIGS. 13(a) and 13(b), so that a height of the cladding layer 130 or a content of the cutting material particles (D) is adjusted, a spraying amount of at least one of the cutting material particles (D) and the metal powder (M) may be adjusted.

Also, as shown in FIG. 14, the cladding layer formed as the single layer may be formed such that a plurality of segment layers S1, S2, and S3 are combined on the cutting/polishing body 120, and as described in FIGS. 11(a) to 11(c), it is possible to have various structures depending on the inclusion of the cutting material particles (D) and the content of the cutting material particles (D).

Also, in order to form the cutting/polishing body 120, a relative movement between the heating device 210 and the tool body 110 may be required, and for this, a translational movement may be performed with respect to the tool body 110 (see FIG. 8), a rotary movement may be performed with respect to the tool body 110 (see FIGS. 5, 7, and 9), or a translational/rotary movement may be performed with respect to the tool body 110. In this manner, in the cladding layer formed as the single layer, the cutting/polishing body 120 having various shapes may be formed on the tool body 110 having various types, as shown in FIGS. 15(a) to 15(d). Accordingly, it is possible to manufacture the cutting/polishing tool having various functions and performances.

Meanwhile, the method for manufacturing the cutting/polishing tool according to an exemplary embodiment of the present invention may be applied to repair the tool including a damaged cutting/polishing body, and in this case, the cladding layer may be formed with respect to the damaged cutting/polishing body.

Hereinafter, a cutting/polishing tool according to another exemplary embodiment of the present invention will be described.

Referring to FIGS. 5 and 10, the cutting/polishing tool may include the tool body 110 according to the present invention, and at least one cutting/polishing body 120 including a cladding layer having the cutting material particles (D) while the cladding layer is formed such that the metal powder (m) is deposited on the outer surface 111 of the tool body 110. Here, the cutting material particles (D) of the cladding layer 130 that are directly formed on the outer surface 111 of the tool body 110 may be more densely located in a part closer to the tool body 110 rather than a part further away from the tool body 110, as shown in FIG. 10(a).

In this instance, as shown in FIGS. 10(b) and 10(c), the cutting/polishing body 110 may be formed such that a plurality of cladding layers 130 and 140 are accumulated, and may include the cutting material particles (D) having a uniform distribution throughout a thickness of the cutting/polishing body 120.

Also, as shown in FIGS. 11(a) to 11(c), the cladding layers 130 and 140 may be formed such that a plurality of segment layers S1, S2, S3, S4, S5, and S6, formed such that the metal powder (M) is deposited, are combined. In this case, the cladding layer 130 may be formed such that the plurality of segment layers S1, S2, S3, S4, S5, and S6, classified depending on whether to include the cutting material particles (D) and a content of the cutting material particles (D), are combined. As an example, as shown in FIG. 11(b), the cladding layer 130 may include first segment layers S2, S4, and S6 including the cutting material particles (D) while the metal powder (M) is deposited, and second segment layers S1, S3, and S5 not including the cutting material particles (D) while the metal powder (M) is deposited. Also, as shown in FIG. 11(c), the cladding layer 130 may include first segment layers S2, S3, S5, and S6 including the cutting material particles (D) while the metal powder (M) is deposited, and second segment layers S1 and S4 not including the cutting material particles (D) while the metal powder (M) is deposited, and the first segment layers S2, S3, S5, and S6 may be further classified depending on an amount of the cutting material particles (D).

Also, as shown in FIG. 14, in a case where a single cladding layer configures the cutting/polishing body 120, the cladding layer may have a configuration where a portion of the cutting material particles (D) is exposed to the outside without being covered with the metal powder (M), and thereby it is possible to manufacture various types of the cutting/polishing tool 100 as shown FIGS. 15(a) to 15(d).

The present invention is not limited to the above-mentioned embodiments and the accompanying drawings. It is to be noted that components according to the present invention can be substituted, modified, and changed without departing from the technical spirit of the present invention.

The invention claimed is:

1. A method for manufacturing a cutting/polishing tool including at least one cutting/polishing body, the method comprising:
   preparing a tool body; and
   forming a cladding layer including cutting material particles by spraying, onto an outer surface of the tool body, the cutting material particles and a metal powder, the metal powder having a specific gravity greater than a specific gravity of the cutting material particles, while heating the outer surface of the tool body using a heating device installed at a lower side of the outer surface of the tool body such that the direction of the energy emitted from the heating device is opposite the direction of gravity, so that the metal powder is deposited on the outer surface of the cladding layer and the cutting material particles are distributed in the cladding layer,
   wherein the outer surface of the tool body is divided into a plurality of cladding layer-forming sections of the tool body each corresponding to a part of the outer surface onto which the deposition of the metal powder forms a cladding layer section that is processed by the heating device in accordance with movement of the tool body relative to the heating device,
   wherein an acute angle defined between (a) a first vector that is a surface normal line extending outwardly from a deposition point of the outer surface of the tool body at which deposition is occurring, and (b) a second vector representing the force of gravity extending outwardly from the tool body in the downward gravity direction from the deposition point, is in the range of −10 degrees to 40 degrees, and
   wherein the cladding layer configures the at least one cutting/polishing body.

2. The method of claim 1, further comprising:
   accumulating at least one new cladding layer including the cutting material particles by spraying, onto an outer surface of the previously formed cladding layer, the cutting material particles and the metal powder while heating the outer surface of the previously formed cladding layer using the heating device so that the metal powder is deposited on the outer surface of the previously formed cladding layer, wherein the accumulated cladding layer configures the cutting/polishing body.

3. A method for manufacturing a cutting/polishing tool including at least one cutting/polishing body, the method comprising:
preparing a tool body;
forming a cladding layer including cutting material particles by spraying, onto an outer surface of the tool body, the cutting material particles and a metal powder, the metal powder having a specific gravity greater than a specific gravity of the cutting material particles, while heating the outer surface of the tool body using a heating device installed adjacent a bottom side of the tool body, so that the metal powder is deposited on the outer surface of the bottom side of the cladding layer and the cutting material particles are distributed in the cladding layer,
wherein the outer surface of the tool body is divided into a plurality of cladding layer-forming sections of the tool body each corresponding to a part of the outer surface onto which the deposition of the metal powder forms a cladding layer section that is processed by the heating device in accordance with movement of the tool body relative to the heating device,
wherein the heating device heats the respective cladding layer section being formed while forming an acute angle smaller than 40 degrees between (a) a first vector representing the force of gravity extending outwardly from the tool body in the downward gravity direction from a deposition point of the outer surface of the tool body at which deposition is occurring, and (b) a second vector that intersects the first vector and that extends in the direction of the energy emitted from the heating device towards the outer surface of the tool body at which deposition is occurring, and wherein the cladding layer configures the cutting/polishing body.

4. The method of claim 1, wherein:
the tool body is moved in a direction perpendicular to the gravity direction, and
an acute angle between defined by the respective first vector and the respective second vector at each point on the outer surface onto which deposition occurs is maintained in a range of −10 degrees to 40 degrees during a process where the cutting material particles are floating within the cladding layer sections being formed by the deposition.

5. The method of claim 1, wherein the cladding layer is formed such that a plurality of segment layers including the cutting material particles are combined, while the metal powder is deposited.

6. The method of claim 1, wherein the cladding layer is formed such that a plurality of segment layers are combined, wherein some of the segment layers include different amounts of the cutting material particles than other of the segment layers.

7. The method of claim 6, wherein the cladding layer includes a first segment layer including the cutting material particles while the metal powder is deposited, and a second segment layer not including the cutting material particles while the metal powder is deposited.

8. The method of claim 1, wherein the forming of the cladding layer is performed while adjusting a spraying amount of at least one of the cutting material particles and the metal powder so that a height of the cladding layer is adjusted.

9. The method of claim 2, wherein:
the cladding layer is formed such that a plurality of segment layers are combined, the plurality of segment layers being formed such that the metal powder is deposited,
the forming of the cladding layer forms a single cladding layer by forming the plurality of segment layers, and
the accumulating forms the plurality of segment layers, where the metal powder is deposited on the outer surface of the cladding layer formed such that the plurality of segment layers are combined, to thereby form the accumulated cladding layer.

10. The method of claim 2, wherein the forming of the cladding layer includes determining an amount of each of the cutting material particles and the metal powder so that the cutting material particles are not exposed to the outside after the deposition of the metal powder is completed.

11. The method of claim 2, wherein the accumulating at least one new cladding layer includes accumulating an amount of each of the cutting material particles and the metal powder in the new cladding layers such that the cutting material particles are not exposed to the outside after the deposition of the metal powder is completed.

12. The method of claim 11, further comprising:
after the accumulating, dressing the cutting/polishing body and exposing the cutting material particles to the outside.

13. The method of claim 1, wherein:
the forming the cladding layer includes providing an amount of each of the cutting material particles and the metal powder such that a part of the cutting material particles is exposed after the deposition of the metal powder is completed, and
the cladding layer formed as a single layer through the forming of the cladding layer configures the cutting/polishing body.

14. The method of claim 1, wherein the cutting material particles include diamond particles, and the heating device is a laser device emitting a laser having a wavelength that penetrates the diamond particles.

15. The method of claim 14, wherein an output of the heating device is adjusted such that a temperature of a molten pool where the metal powder is melted does not exceed a preset temperature.

16. The method of claim 1, wherein the tool body includes a section of damaged cutting/polishing body, and the forming the cladding layer includes forming the cladding layer on at least a part of the section of the damaged cutting/polishing body.

17. The method of claim 3, further comprising:
accumulating at least one new cladding layer including the cutting material particles by spraying, onto an outer surface of the previously formed cladding layer, the cutting material particles and the metal powder, while heating the outer surface of the previously formed cladding layer using the heating device so that the metal powder is deposited on the outer surface of the previously formed cladding layer and the cutting material particles are distributed in the new cladding layer, wherein the accumulated cladding layer configures the cutting/polishing body.

18. The method of claim 3, wherein the tool body is moved in a horizontal direction perpendicular to the direction of gravity, and
an acute angle defined between the respective first vector and the respective second vector at each point on the outer surface onto which the deposition occurs is maintained at smaller than 40 degrees during a process where the cutting material particles are floating within the cladding layer sections being formed by the deposition.

19. A method for manufacturing a cutting/polishing tool including at least one cutting/polishing body, the method comprising:

preparing a tool body; and forming a cladding layer including cutting material particles by spraying, onto an outer surface of the tool body, the cutting material particles and a metal powder, the metal powder having a specific gravity greater than a specific gravity of the cutting material particles, while heating the outer surface of the tool body using a heating device installed at a lower side of the outer surface of the tool body such that the direction of the energy emitted from the heating device is opposite the direction of gravity, so that the metal powder is deposited on the outer surface of the cladding layer and the cutting material particles are distributed in the cladding layer, wherein the outer surface of the tool body is divided into a plurality of cladding layer-forming sections of the tool body each corresponding to a part of the outer surface onto which the deposition of the metal powder forms a cladding layer section that is processed by the heating device in accordance with movement of the tool body relative to the heating device, wherein the tool body is moved relative to the heating device, wherein an acute angle defined between (a) a first vector that is a surface normal line extending outwardly from a deposition point of the outer surface of the tool body at which deposition is occurring, and (b) a second vector representing the force of gravity extending outwardly from the tool body in the downward gravity direction from the deposition point, is maintained in the range of −10 degrees to 40 degrees during a process where the cutting material particles are floating within the cladding layer sections being formed by the deposition as the tool body is moved relative to the heating device in a horizontal direction perpendicular to a gravity direction, and wherein the cladding layer configures the at least one cutting/polishing body.

20. The method of claim 19, wherein the forming of the cladding layer includes determining an amount of each of the cutting material particles and the metal powder so that the cutting material particles are not exposed to the outside surface of the cladding layer after the deposition of the metal powder and cutting material particles is completed.

* * * * *